US008542875B2

(12) United States Patent
Eswara (10) Patent No.: US 8,542,875 B2
(45) Date of Patent: Sep. 24, 2013

(54) IMAGE PROCESSING BASED ON VISUAL ATTENTION AND REDUCED SEARCH BASED GENERATED REGIONS OF INTEREST

(75) Inventor: Lalitha M. Eswara, Karnatake (IN)

(73) Assignee: Honeywell International Inc., Morristown, NJ (US)

( * ) Notice: Subject to any disclaimer, the term of this patent is extended or adjusted under 35 U.S.C. 154(b) by 398 days.

(21) Appl. No.: 12/885,171

(22) Filed: Sep. 17, 2010

(65) Prior Publication Data
US 2012/0070075 A1 Mar. 22, 2012

(51) Int. Cl.
G06K 9/00 (2006.01)
(52) U.S. Cl.
USPC ............................ 382/103; 382/104; 382/106
(58) Field of Classification Search
USPC .......................................... 382/103, 104, 106
See application file for complete search history.

(56) References Cited

U.S. PATENT DOCUMENTS

| | | | | |
|---|---|---|---|---|
| 5,410,250 A * | 4/1995 | Brown | .......................... | 324/309 |
| 5,760,902 A * | 6/1998 | Brody | .......................... | 356/458 |
| 6,389,169 B1 | 5/2002 | Stark et al. | | |
| 6,801,655 B2 * | 10/2004 | Woodall | ......................... | 382/156 |
| 6,934,415 B2 | 8/2005 | Stentiford | | |
| 2010/0027863 A1 * | 2/2010 | Venkataraman et al. | ..... | 382/131 |

* cited by examiner

Primary Examiner — Tom Y Lu
(74) Attorney, Agent, or Firm — Seager Tufte & Wickhem LLC (57) ABSTRACT

A system for complexity reduction in images involving concepts of visual attention based most probable region detection for object presence and perspective-view based reduced scale-search approaches. Visual attention concept in context uses gradient and contrast of an image. A pixel meeting certain criteria for gradient or contrast values may be further processed for object presence. Limiting image processing to such regions may reduce the complexity of digitized images. Post processing the outcome using morphological operations like dilation and erosion appropriately may help retain some of the missed object pixels in the resultant image. Typically image blocks at different scales are searched for object presence. Reduced-scale search involves removing certain scales during search. As object size in image varies with its location scales within a given scale-range if searched, may lead to higher chances of object presence. This is implemented using relative heights and widths estimation using the perspective view concept.

12 Claims, 5 Drawing Sheets

IMAGE PROCESSING BASED ON VISUAL ATTENTION AND REDUCED SEARCH BASED GENERATED REGIONS OF INTEREST

BACKGROUND

This invention pertains to generating image regions of interest for object detection and particularly to time complexity reduction thereof. More particularly, the invention pertains to digitized images of such objects.

SUMMARY

The invention relates to time complexity reduction during image processing pertaining to object detection by generating regions of interest for object detection processing. It involves two approaches. One involves visual attention concept and outputs a most probable region for object presence in a digital image. The second approach uses reduced-search concept for complexity reduction during processing. Processing images may relate to the existence of the object in the digital image.

The gradient and contrast of an image may lead to regions of object presence based on visual attention concept. Limiting image processing to such regions may reduce the complexity in processing the digitized images. The gradient and contrast of an incoming image may be determined and be a basis as to whether certain pixels should be processed or not. Pixels not meeting a certain threshold criterion for gradient or contrast values, should not be processed and hence not be part of the resultant image. Pixels meeting such threshold criterion may be processed to be part of the resultant image. Since there can be a situation where pixels on the object may not meet the threshold criterion, post-processing approaches using morphological operations may be applied appropriately to minimize the missing pixels. The resultant output image may be processed more expeditiously than the original input image because of an absence of the generally unneeded pixels.

The complexity of an image may also be reduced by searching for objects only at specific scales in the image, which may be regarded as a reduced scale-search operation. This approach applies to scenarios where a particular object of a given size or objects of very same or similar sizes need to be detected in the image. Scale in this context is the relative size of the object at different locations in the digital image. Object search in an image may be performed by considering image blocks at different scales and testing these blocks for object presence. Reduced scale-search may be done by searching for image blocks that may fall within a range of scales pertaining to the estimated object size in the image at different locations in the image. This relative size of object arises due to perspective view of the camera, which can be computed off-line based on the camera view. This approach is sensitive to change in object size, camera, its view or placement.

DESCRIPTION

Input visual cues to the human eye may be processed using highly complex computations in a fraction of a second. Another observation is that one may process information of interest rather than processing each and every small region consciously and systematically. This being the motivation, the present approach may use two ways for generating regions of interest in the images for further processing for object detection and thereby complexity reduction—one, for performing an initial level of object presence probabilistic region detection in an image, whose output can then be used for detailed object detection approaches, and two, detect image blocks within specific size limits (or scales) pertaining to the object size considered, within the image for object detection for further processing. These image blocks are sub-regions of the image.

Object detection may be widely performed using images for various applications. These objects may be of pre-defined or changing shapes, objects with various articulations and poses, vulnerable road units (VRUs), and so forth. Some of the applications may include object detection in autonomous navigation, detection of various objects in images for various purposes such as healthcare, robotic vision, cue-based index retrieval, object recognition and classification, and so on. Some of these objects may be complex and thus the features that define these objects can also be complex in nature. Also, high resolution of the captured image may help in better performance as the features extracted can be better defined. In situations where same object can have different articulations and poses, such as VRUs, retrieval of objects such as 'jars', 'bottles', 'tables', 'chairs' or any such generic objects from digital images, the cues or features may be complex and varying in nature and there could be multiple re-visits for each pixel during processing for better results. This may bring in high complexity in the solution resulting in slower throughput. In many of the applications, it may be beneficial to have real-time or near real-time throughput as the high time delays can pose a serious challenge. Higher the complexity of the object properties in the image, higher may be the complexity of the feature vector or classification approaches, leading to higher complexity. Thus, it appears imperative to find out a technique to reduce the computations which may be addressed by the present approaches.

One approach for performing object detection that may help in complexity reduction is to reduce the pixels on which object detection needs to be performed.

For this purpose, the present approach may use the concepts of visual attention for a noted issue. Visual attention in humans appears to be primarily triggered using three major cues—motion, contrast and edge information. The present approach may use contrast and edge or gradient information, though motion also could be used to reduce the search space. Gradient information may be derived from the image and binarized using an adaptive threshold. Also, a binarized contrast image may be extracted using an adaptive threshold derived from statistical information of the Y channel image derived from the input RGB image using standard conversion formulae. The noted two images, namely, the binarized gradient image and the binarized contrast image may be merged and a resultant image be formed. The resultant image may contain the most probable regions of object presence, be it of any object. A post-processing operation may then be performed on the resultant image using morphological operations (erosion and dilation) appropriately to minimize the areas of missing pixels on the object.

An approach two may focus on using reduced search criteria for the search that is required to be performed as a standard image processing technique for object detection. For example, an object of certain size (to be detected), may appear at different scales in an image (an object at a far off distance looks smaller in the camera perspective view than the same object when located nearer to the camera). One may refer to these changes in sizes as scales. As the object size in pixels across the image can vary based on its location, it may be imperative to search for the object in the image at multiple scales. The present approach may be a solution that uses the concept of perspective view that has been implemented using a non-linear interpolation technique. This approach may effectively eliminate processing of pixel regions at scales that do not contribute to the outcome. The basic concept of perspective view implementation using non-linear interpolation may be noted, and this invention may use this concept along with the visual attention concept to reduce the processing pixels in a digital image.

Summarizing, the main aspects of the present approach may incorporate: 1) a technique for time complexity reduction using a visual attention based technique for reduced search space analysis in an image, where the technique is as described herein; and 2) a technique for reduced scale-search using a camera perspective geometry concept using a probable object height or width in pixels at different image locations within the reduced search space or any image region as the case may be. The perspective geometry is sensitive to camera placement and change of view.

As mentioned above, there may be two aspects of the present approach. The first involves using contrast and gradient information for identifying the most probable regions for presence of the object, followed by morphological operations of erosion and dilation to encompass most of the required information in the scene that can contain objects.

The second involves the concept of objects far away from a camera occupying lesser pixels both in width and height dimensions; whereas, the same objects closer to camera may be seen larger in the image. This is a property of perspective view in the camera, which is specific to camera, its view and placement. One may refer to these changes in sizes as scales. During an object detection process, the image is searched considering image blocks of size indicated by these scales (sizes) for object detection. The present approach may use limited search in the image for these varying scales based on estimating height or width of the object at virtually all the pixels. This height or width estimation may use any standard non-linear irregular interpolation approach. A search for an object at scales that fall within a range of the estimated values may be performed instead of a minimum scale (height or width pixels representing the object when located farthest from the camera) to maximum scale (height or width pixels representing the object when located nearest to the camera) of objects. This approach applies to scenarios where a particular object of a given size or objects of very same or similar sizes need to be detected in the image. Scale in this context is the relative size of the object at different locations in the digital image Contrast and edge/gradient may be used for background subtraction and not necessarily for reduced probability search as in the context of the present way. The traditional background subtraction techniques may be used for static cameras only; whereas the present way involving approach one for using contrast and gradient can be used for stationary and mobile camera applications. There is no necessity for a background image that does not contain the object or foreground information, and no background learning is necessarily involved.

Reduced search space mentioned in the present approach may not necessarily be used as explained for object most probable region detection, though perspective geometry of cameras may be acknowledged.

Figure 1:
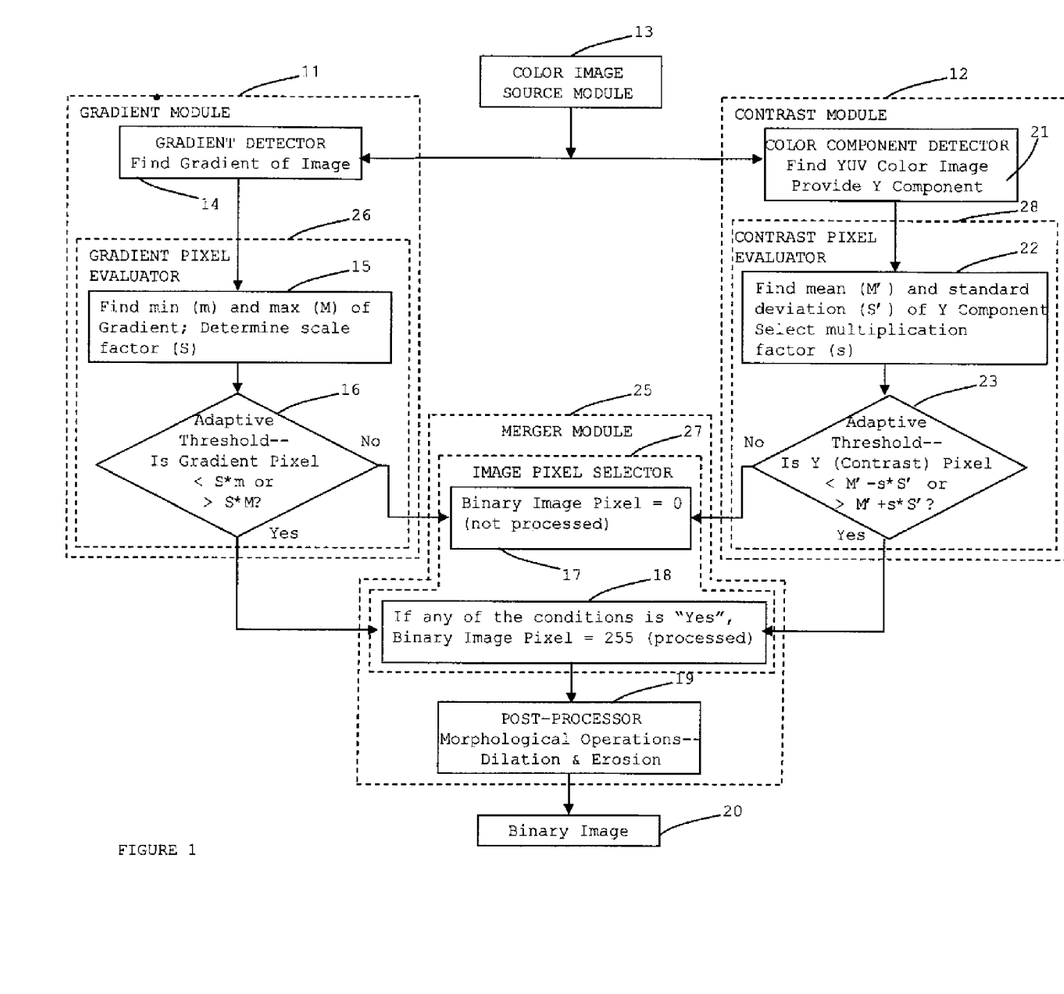
FIG. 1 is a flow diagram that shows a visual attention-based concept for time and complexity reduction relative to image processing.

Approach one for complexity reduction is explained as follows. Human visual attention may scan an image, based either on motion, contrast or edge information. As the motion information is not necessarily used in this work, contrast and edge information may be used to reduce the computations. Edge information is the gradient information, whereas contrast is computed from the Y Channel of the YUV image of the input RGB image. RGB to YUV conversion uses standard conversion formulae. The gradient and the resultant image from the Y channel image may be fused and then a post-processing operation to minimize missing pixels on object can be implemented (i.e., morphological operations). The output of this approach may be a "binary image". FIG. 1 pictorially shows this technique, which is a visual attention based concept for time and complexity reduction.

FIG. 1 is a flow diagram that shows the concept of complexity reduction related to image processing in the current context. One portion of the diagram is about "humans focus attention where there is a higher edge density" which may be an emphasis of a gradient module at symbol 11. The gradient module may also be referred to as a gradient pixel selection module. Another portion of the diagram is about the "humans focus attention where there is a higher contrast" which may be an emphasis of a contrast module at symbol 12. The contrast module may also be referred to as a contrast pixel selection module.

The portion concerning edge density or gradient may begin with an input of a color image from an image source module at symbol 13. The gradient of the image may be found with a gradient detector at symbol 14. The minimum (m) and the maximum (M) of the gradient may be found at symbol 15. A scale factor (S) may be determined. As an adaptive threshold, a question of whether a gradient pixel is less than S*m or greater than S*M may be asked at symbol 16. If an answer is no, then the binary image pixel equals zero and it is not processed, as indicated at symbol 17. If the answer is yes, then the binary image pixel equals 255 and may be processed as indicated at symbol 18. These pixels may be processed along with the selected pixels from the contrast module 23. An output from the item in symbol 18 may go to a post-processor at symbol 19. Since some of the pixels are not processed due to item 17, gaps in the image may exist. The items in symbols 15 and 16 may be regarded at least in part as a gradient pixel evaluator at symbol 26. The items in symbols 14 and 26 may be regarded at least in part as the gradient module at symbol 11. The items at symbols 17 and 18 may be regarded at least in part as an image pixel selector or an image pixel screener at symbol 27. The items in symbols 19 and 27 may be regarded at least in part of an image or pixel merger module at symbol 25.

The portion 12 concerning attention on higher contrast may begin with an input of a RGB color image from the image source module at symbol 13. The YUV components of the color image may be found by a color component detector at symbol 21. A Y channel of the image may be provided to an item at symbol 22. The Y channel or subspace may be brightness component and the U and V channels or subspaces may be color components of the image.

A mean (M') and standard deviation (S') of the Y component or subspace from symbol 21 may be found at symbol 22.

A value for "s" may be selected to represent a multiplication factor which may be hard coded based on an application. In an example, "s" may be given a value of 1. Depending on the application, "s" may be given other values. As an adaptive threshold, a question of whether a Y Channel pixel is less than M'−s*S' or greater than M'+s*S' may be asked at symbol 23. If an answer is no, then the binary image pixel equals zero and it is not processed, as indicated at symbol 17. If the answer is yes, then the binary image pixel equals 255 and may be processed as indicated at symbol 18. The Y Channel pixel when passed through the above evaluation may represent contrast in the image. The items in symbols 22 and 23 may be regarded at least in part as a contrast pixel evaluator at symbol 28. The items in symbols 21 and 28 may be regarded at least in part as the contrast module at symbol 12. An output from the item in symbol 18 may go to the post-processor at symbol 19. There can be situations where some or a few of the object pixels may be missed from the resultant regions of object presence. Post-processor involves morphological operations such as erosion and dilation appropriately to minimize the missed pixels. The resultant image, having fewer pixels that need processing, may be processed more quickly than the initial image from the source module at symbol 13. Morphological operations such as erosion and (open operation) and erosion (close operation) may be applied to the image at symbol 19. These operations may be regarded at least in part as a post-processor of the non-processed pixels. A binary image from the one or more items at symbol 19 may be output at symbol 20.

The detail of approach two of complexity reduction is mentioned as follows. A reduced scale search operation for reduction in number of image blocks that need to be searched by using object size or scale in a digital image during an object detection process may be noted. This approach applies to scenarios where a particular object of a given size or objects of very same or similar sizes need to be detected in the image. Any object when seen from the perspective view of the camera may be seen to be of different sizes based on their distances from the camera.

Figure 5:
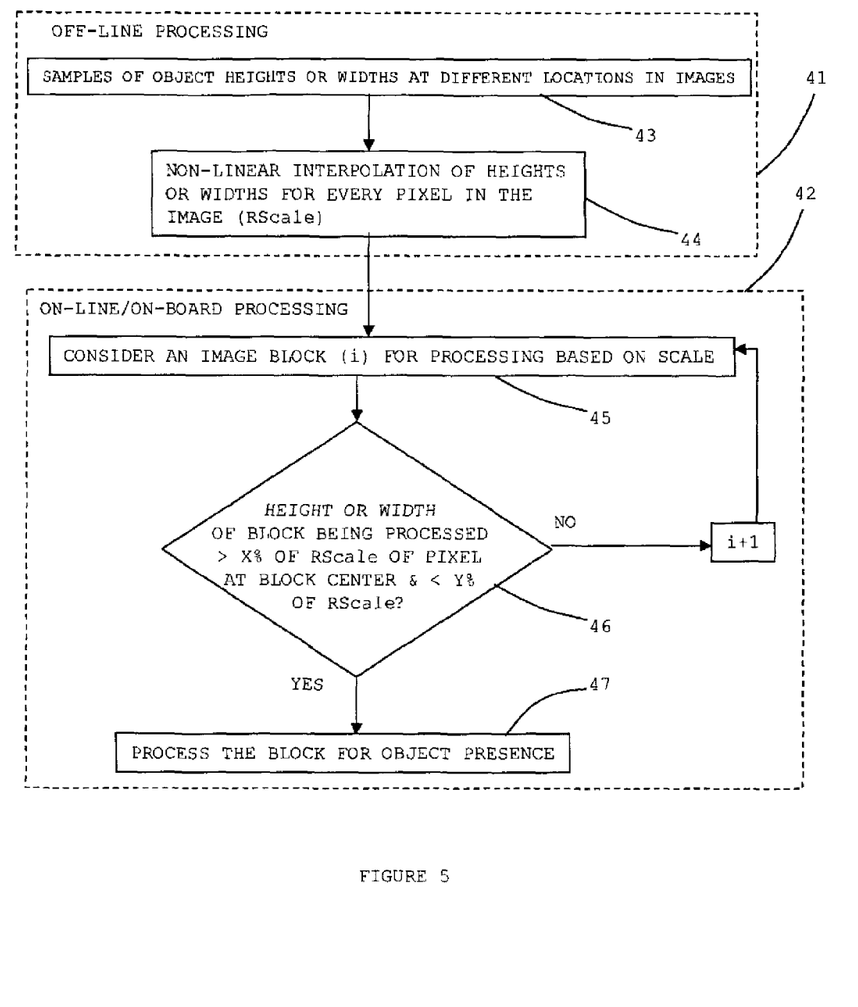
FIG. 5 is a flow diagram of a reduced scale search operation relative to image processing.

An object of size 'N' ft may be seen in lesser pixels in height and width (lower scale) when the object is far away from the camera. If this object is closer to the camera, then it may occupy larger pixels in height and width (higher scale). This variation or object size may be referred to as "scale". But, searching for smaller scales for objects in the front of the camera (wherein the object occupies higher number of pixels and thereby has higher scale) does not necessarily add to detections. Similarly, it is not necessarily beneficial to search for larger scales at far-off distances. This concept may be implemented using the scene information parameter (object height or width estimation). This algorithm may basically be a non-linear interpolation technique for a sparse matrix. Based on the height or width estimated, just those scales that fall within N % of the scale difference would be considered for processing. FIG. 5 is a flow diagram of the reduced scale-search approach discussed herein. In an off-line processing mode of operation (performed as an initial height or width estimate phase) 41, samples of object-heights or widths may be taken at different locations in a set of images at symbol 43. This may be done manually. After symbol 43, a non-linear interpolation of the noted heights or widths may be made for each or every pixel in the image (i.e., RScale) at symbol 44 using available approaches. This concept may be implemented using a non-linear irregular sampling approach. During the object detection processing flow, an image block may be considered for processing based on scale at symbol 45 in an on-line/on-board/testing phase for object presence as in block 42. The current approach may decide whether to consider this block (indicated by (i) in FIG. 5) for further processing or not based on the estimated RScale value at block center. A question at symbol 46 is whether a height or width estimate of the pixel at the considered image block center is greater than X percent of estimated RScale value and less than Y percent of RScale value at the pixel location. If the answer is yes, then the block may be processed for object presence at symbol 47. If the answer is no, then the process is continued for another image block (indicated by (i+1) in FIG. 5) and the current image block may not necessarily be processed for object detection. A specific example of X and Y may be 50 and 150, respectively. However, a ratio of Y/X may vary based on the application.

RScale may be a concept that is incorporated in a context of post-processing of detections. Presently, the RScale concept may be used to reduce the image block search in the images and may be implemented on the binarized image of approach one herein or on any image as the case may be. The perspective geometry is sensitive to camera placement and change of view. Hence when the camera or its view, or placement is changed, re-computation of RScale is needed.

The RScale computation may be used for reducing the complexity with the concept of the reduced search. The advantage of the complexity may be dependent on the camera placement, object size and the object direction of motion in the camera view. If the object moves from top row to bottom row of the image when camera is placed above the ground, titled to see more longitudinal view, complexity reduction in processing can be higher using the height estimated values than the width estimation in the RScale parameter. There may be complexity reduction in processing using the width estimated values in the RScale parameter when the object moves diagonally across the image The approach may result in encouraging time reduction during object detection due to not processing certain image blocks that may not contain the object size that need to be detected.

FIGS. 2a, 2b, 2c, 3a, 3b, 3c, 4a, 4b and 4c show sample results of "Binary Image" obtained using the approach one described herein on different images. The white pixel regions may be processed further. The black pixel regions may not be considered for further processing. It may be noted that the crucial information required in the image is not necessarily lost.

Figure 2A:
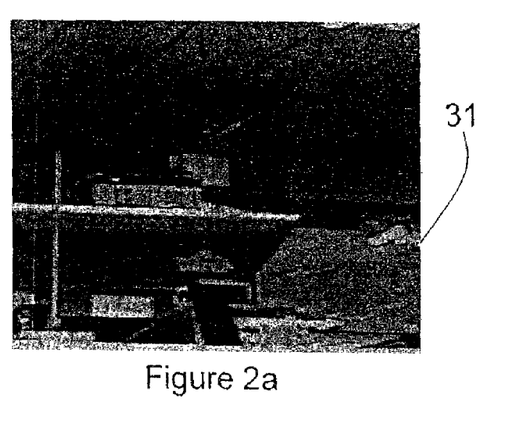
FIGS. 2a, 2b, 2c, 3a, 3b, 3c, 4a, 4b and 4c show sample results of binary image computation on different kinds of images.
Figure 2B:
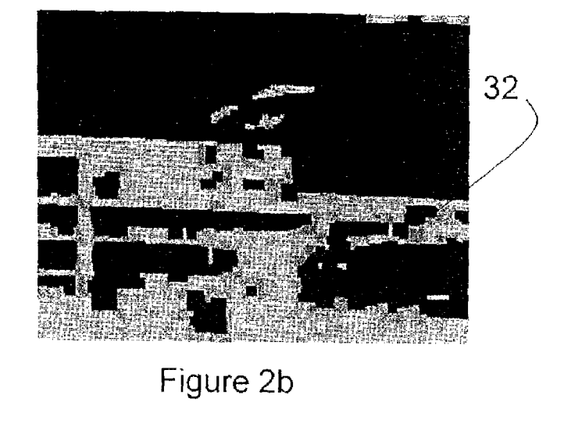
Figure 2C:
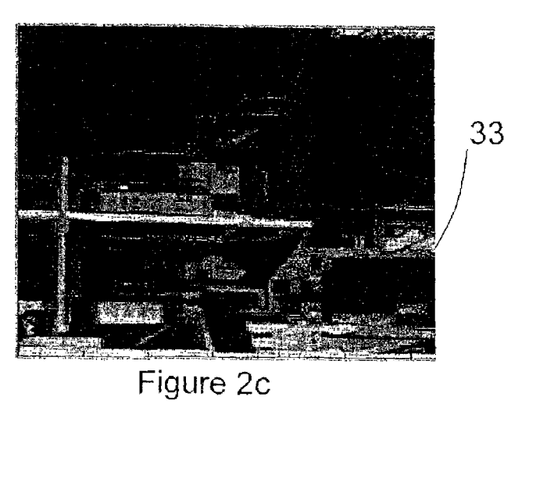

FIGS. 2a, 2b and 2c show images 31-33, respectively. Image 31 is an original image (320×240) and image 32 shows the most probable regions important in an image, and image 33 shows the information retained in image 32. These regions in Image 33 occupy ~60% of the entire image.

Figure 3A:
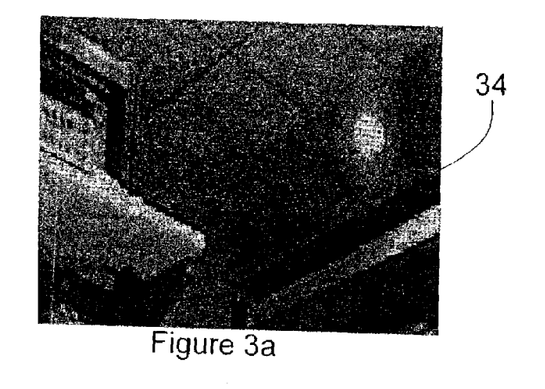
Figure 3B:
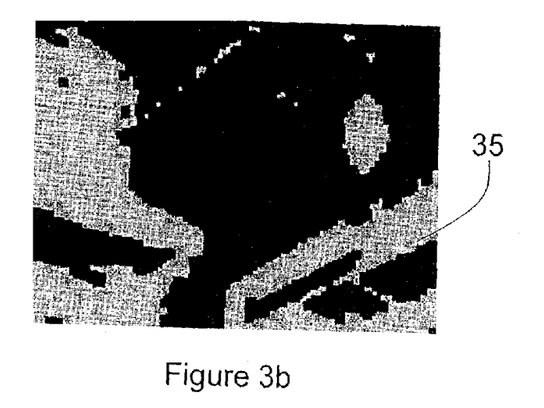
Figure 3C:
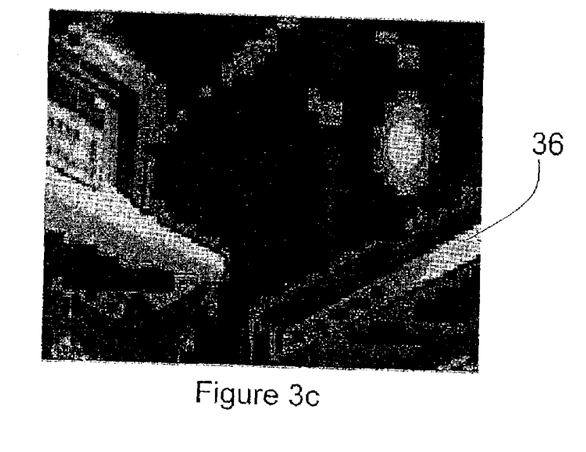

FIGS. 3a, 3b and 3c show images 34-36, respectively. Image 34 is an original image (320×240) and image 35 shows the most probable regions important in an image, and image 36 shows the information retained in image 35. These regions in Image 35 occupy ~59% of the entire image.

Figure 4A:
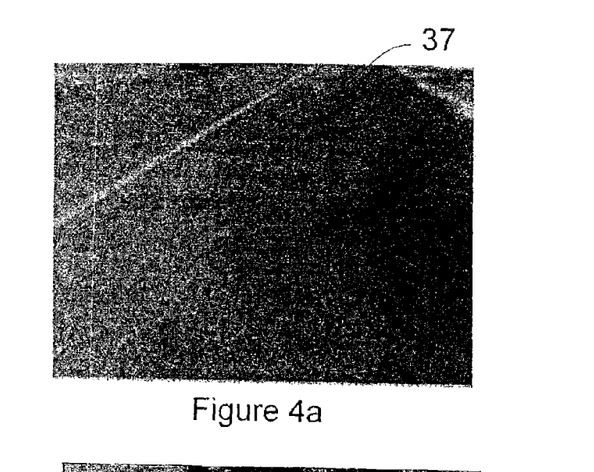
Figure 4B:
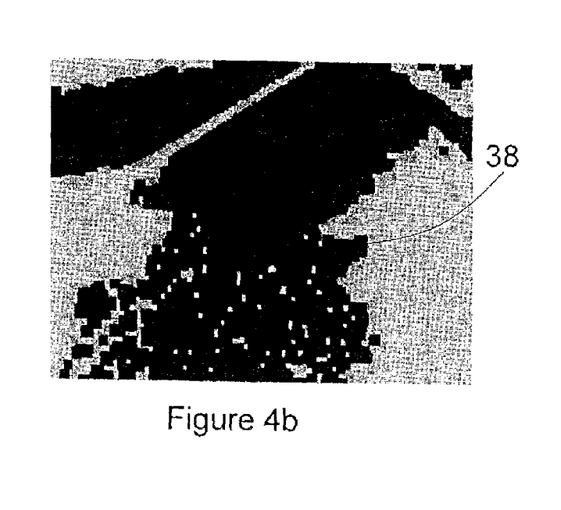
Figure 4C:
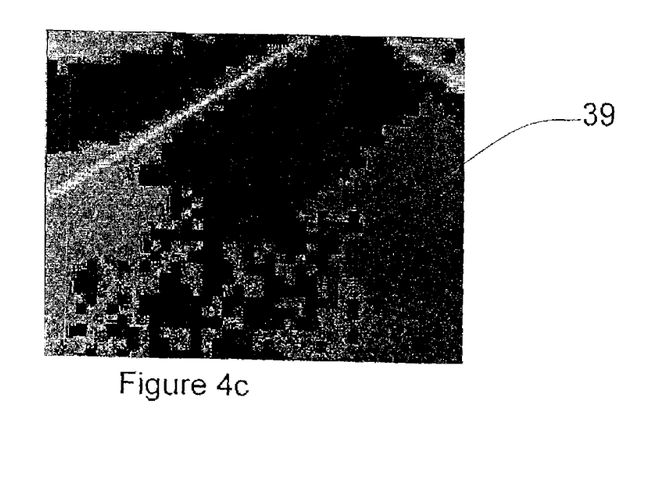

FIGS. 4a, 4b and 4c show images 37-39, respectively. Image 37 is an original image (320×240), image 38 shows the most probable regions important in an image, and image 39 shows the information retained in image 38. These regions in Image 38 occupy ~55% of the entire image.

The present approach may give encouraging results. The black region of the image is not necessarily processed thereby reducing the computation complexity and hence the processing time. The gain obtained is based on the image considered.

The advantages of the present approach may be as follows:
1) It reduces the computational time for each image frame without much reduction in detection rate or any other application like scene understanding or segmentation, when the scene is not highly cluttered; and 2) In scenarios where the image is highly cluttered and the image is full of gradient and contrast information there may not be considerable gain in computations. The additional time taken for processing may be less and may not be significant. In these cases, the time reduction or gain that can be obtained using the present approach may be lesser in magnitude and there may be no significant gain in time taken for processing.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An approach for reducing complexity of digitized images by using visual attention, comprising:
   determining a gradient image of an input image;
   determining a YUV image of the input image;
   evaluating gradient pixels of the gradient image;
   processing the gradient pixels having values meeting an adaptive threshold;
   evaluating Y-channel pixels of the YUV image as contrast pixels;
   processing contrast pixels having values meeting an adaptive threshold; and
   merging processed gradient and contrast pixels into an output image.

2. The approach of claim 1, further comprising a post-processor to minimize missed pixels of an object in the output image where there are no processed pixels using morphological operations like erosion and dilation.

3. The approach of claim 1, wherein:
   a contrast image comprises evaluated pixels of a Y-channel of the YUV image; and
   the evaluated pixels of a Y-channel image are contrast pixels.

4. The approach of claim 3, further comprising:
   determining a mean and standard deviation of values of the pixels of the Y-channel image; and
   checking whether a value of a pixel of the Y-channel image is <(M's*S') or >(M'+s*S'); and
   wherein:
   M' represents the mean;
   S' represents the standard deviation;
   s represents a multiplication factor; and
   the adaptive threshold is <(M's*S') or >(M'+s*S').

5. The approach of claim 4, wherein:
   if a value of a pixel of the Y-channel image is <(M's*S') or >(M'+s*S'), then the pixel is processed; and
   if a value of a pixel of the Y-channel image is not <(M's*S') or >(M'+s*S'), then the pixel is not processed.

6. The approach of claim 1, further comprising:
   determining a minimum and a maximum of values of the gradient pixels of the gradient image; and
   checking whether a value of a gradient pixel is <(S*m) or >(S*M); and
   wherein:
   M represents the maximum;
   m represents the minimum;
   S represents a scale factor; and
   the adaptive threshold is <(S*m) or >(S*M).

7. The approach of claim 6, wherein:
   if a value of a gradient pixel is <(S*m) or >(S*M), then the pixel is processed; and
   if a value of a gradient pixel is not <(S*m) or >(S*M), then the pixel is not processed.

8. A system for reducing complexity of digital images, comprising:
   an image source module;
   a gradient pixel selection module connected to the image source module;
   a contrast pixel selection module connected to the image source module; and
   a pixel merger module connected to the gradient pixel selection module and to the contrast pixel selection module; and
   wherein:
   the gradient pixel selection module comprises a gradient detector connected to the image source module and a gradient pixel evaluator connected to the gradient pixel selection module and the pixel merger module, the gradient pixel evaluator finding minimum and maximum values, and selecting a scale factor for a gradient of an image; and
   if a gradient pixel has a value less than a product of a scale factor and the minimum value or greater than a product of the scale factor and the maximum value, then the gradient pixel is processed as part of an output image; and if the gradient pixel does not have a value less than a product of the scale factor and the minimum value or greater than a product of the scale factor and the maximum value, then the gradient pixel is not processed as part of an output image.

9. The system of claim 8, wherein the contrast pixel selection module comprises:
   a Color Component detector connected to the image source module; and
   a contrast pixel evaluator connected to the color component detector and the pixel merger module.

10. The system of claim 8, wherein the pixel merger module comprises:
    an image pixel screener or selector;
    a post processor; and
    a binary image output module connected to the post processor.

11. A system for reducing complexity of digital images, comprising:
    an image source module;
    a gradient pixel selection module connected to the image source module;
    a contrast pixel selection module connected to the image source module; and
    a pixel merger module connected to the gradient pixel selection module and to the contrast pixel selection module;
    wherein the gradient pixel selection module comprises a gradient detector connected to the image source module and a gradient pixel evaluator connected to the gradient pixel selection module and the pixel merger module; and
    wherein the contrast pixel evaluator finds a mean, a standard deviation and selects a multiplication factor for a Y-channel image.

12. The system of claim 11, wherein:
    if a Y-channel pixel has a value less than the mean minus a product of the multiplication factor and the standard deviation or greater than the mean plus the product of the multiplication factor and the standard deviation, then the pixel is processed; and if the Y-channel pixel does not have a value less than the mean minus a product of the multiplication factor and the standard deviation or greater than the mean plus the product of the multiplication factor and the standard deviation, then the pixel is not processed as part of an output image.

* * * * *